Figure 1:
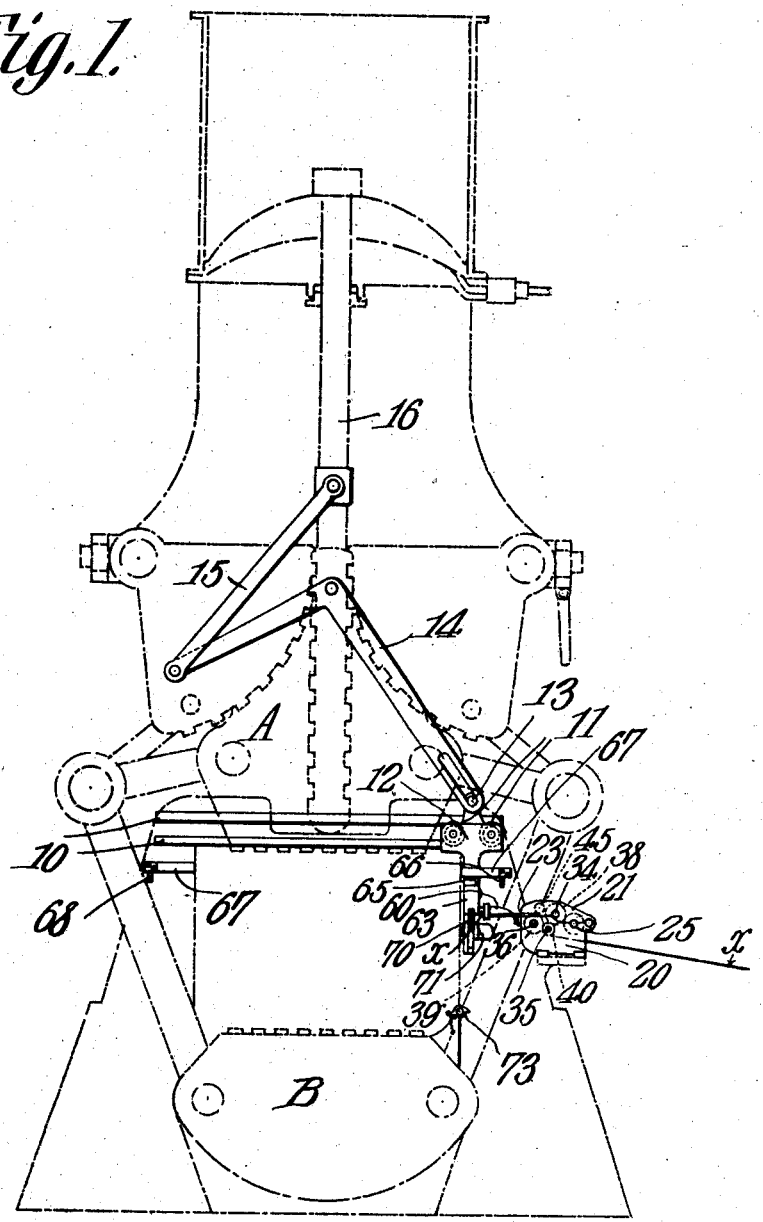

No. 893,747. PATENTED JULY 21, 1908.
W. L. McCARTY.
BALING PRESS.
APPLICATION FILED OCT. 17, 1907.

4 SHEETS—SHEET 1.

Witnesses

Wreford L. McCarty, Inventor

By C.A. Snow & Co.
Attorneys

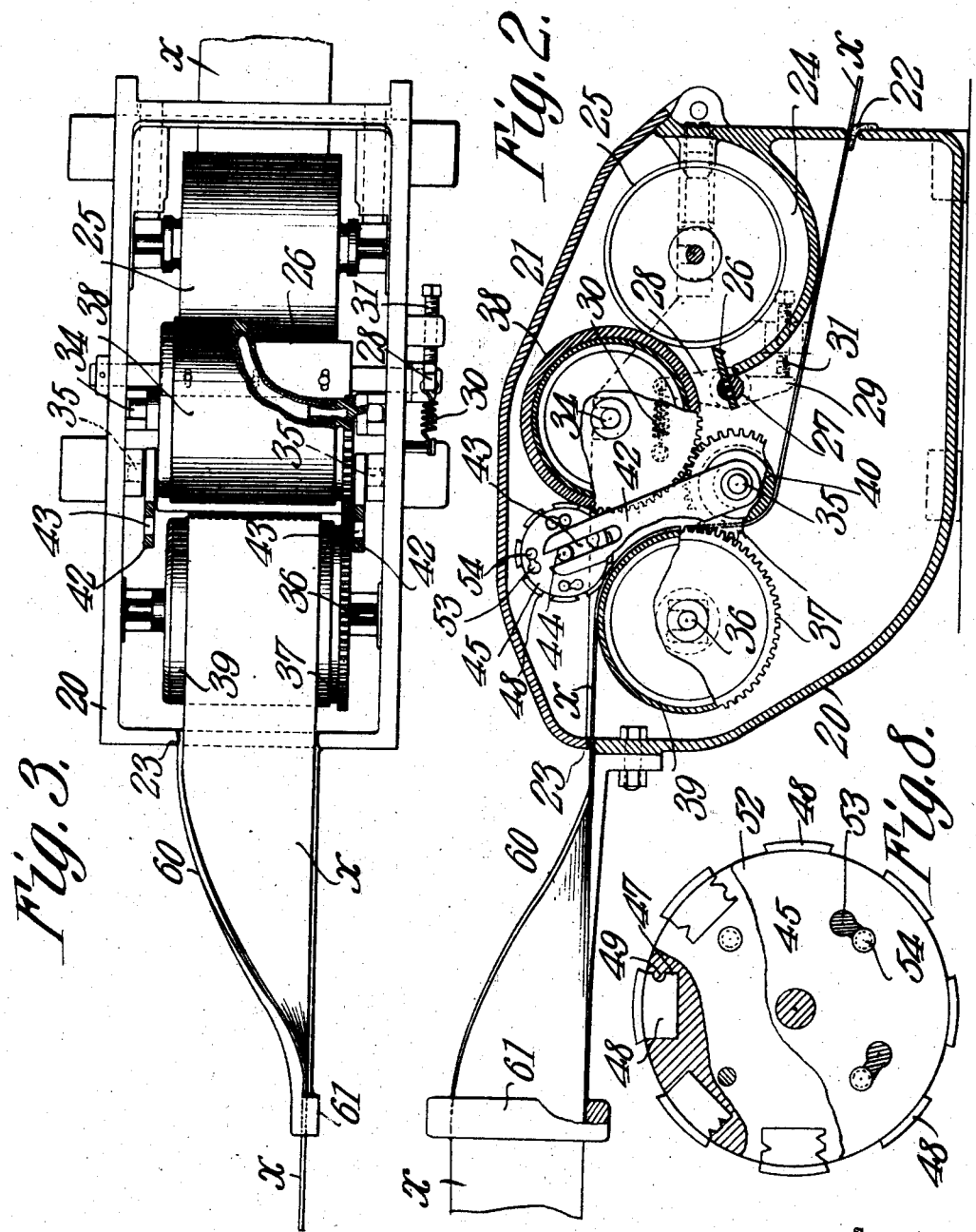

No. 893,747. PATENTED JULY 21, 1908.
W. L. McCARTY.
BALING PRESS.
APPLICATION FILED OCT. 17, 1907.
4 SHEETS—SHEET 3.
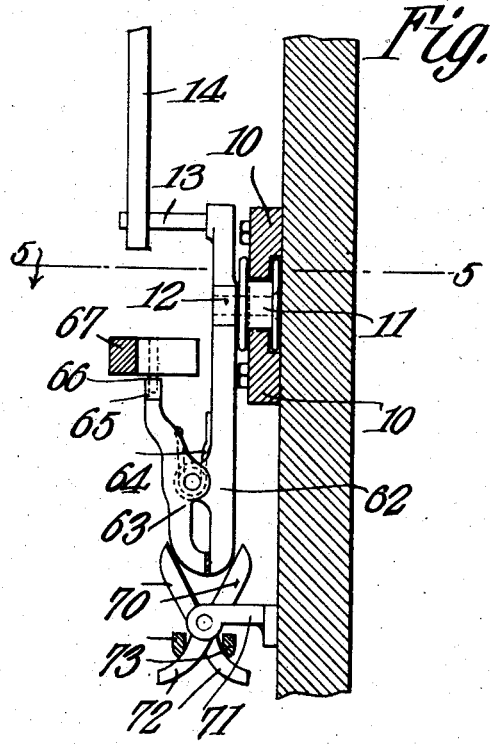
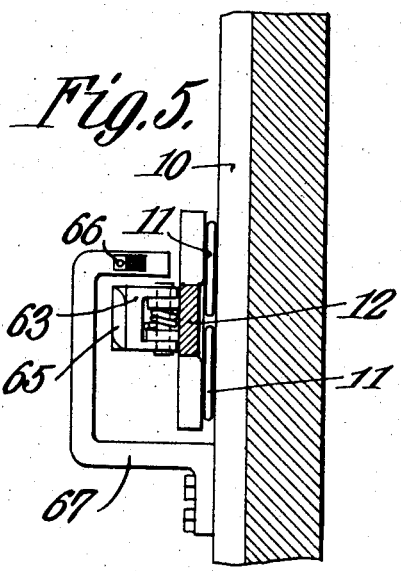
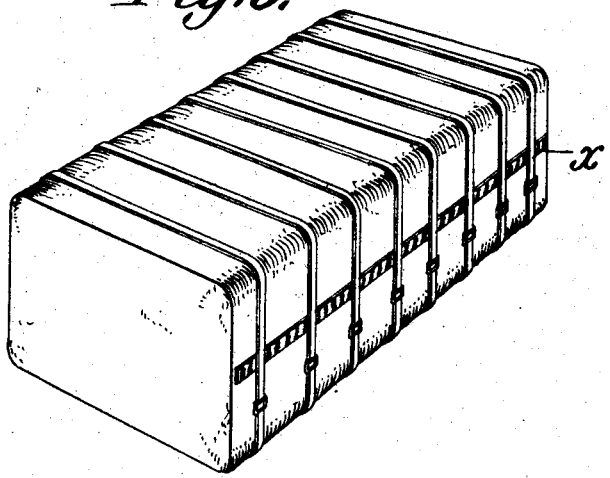
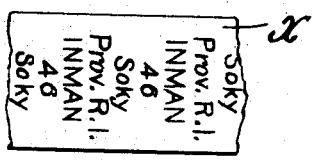
Witnesses
E. W. Stewart
Jno. E. Parker
Inventor
Wreford L. McCarty.
By C. A. Snow & Co.
Attorneys

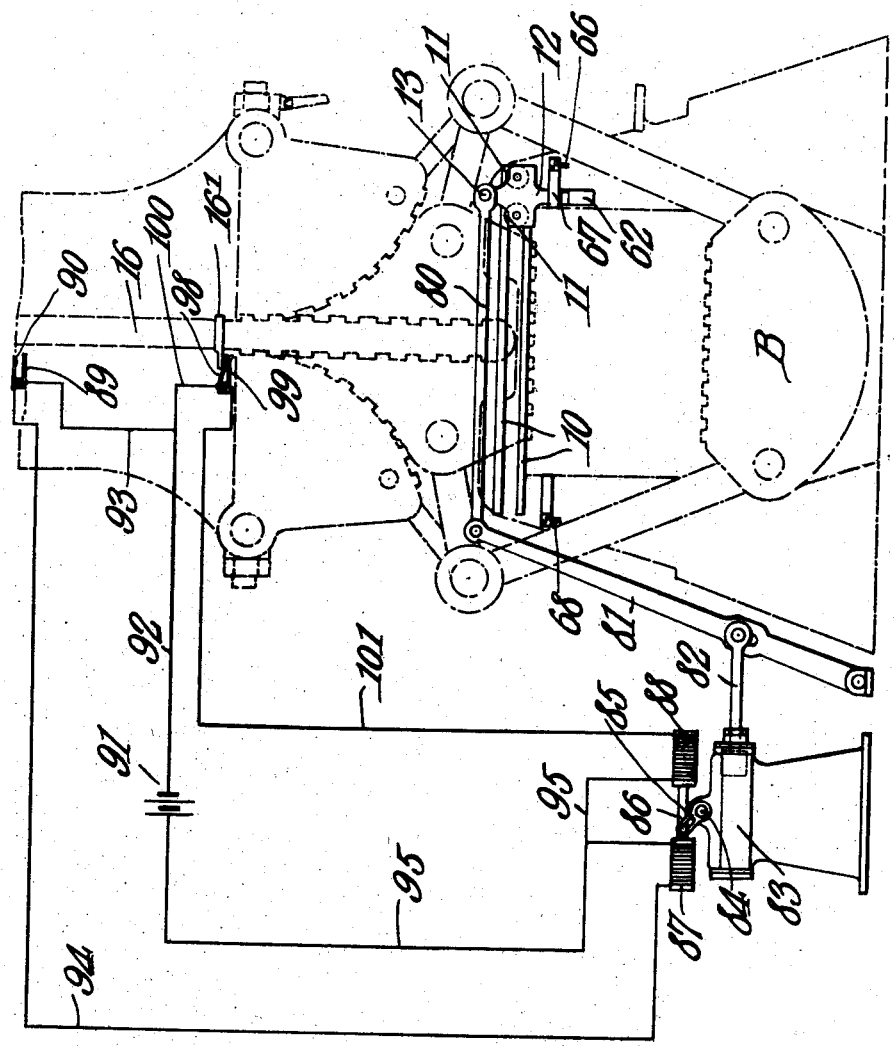

UNITED STATES PATENT OFFICE.

WREFORD L. McCARTY, OF MEMPHIS, TENNESSEE.

BALING-PRESS.

No. 893,747.        Specification of Letters Patent.        Patented July 21, 1908.

Application filed October 17, 1907. Serial No. 397,925.

*To all whom it may concern:*

Be it known that I, WREFORD L. McCARTY, a citizen of the United States, residing at Memphis, in the county of Shelby and State of Tennessee, have invented a new and useful Baling-Press, of which the following is a specification.

In handling bales of cotton, considerable difficulty is experienced in properly identifying bales belonging to different owners, or bales of certain quality or weight, owing to the loss of identifying marks, tags, and the like, which become mutilated or defaced when the bales are packed.

The principal object of the present invention is to provide a bale with an identifying means of which at least some portion will be retained and exposed to view until the bale is ready for use.

A further object of the invention is to provide a means whereby an identifying strip may be attached to the bale while the latter is being compressed, or before or after the compressing operation, the strip being printed and bearing at many different points in its length the point of origin, the name of the shipper, the mark of the cotton, and the destination. The strip extends the full length of the bale, and generally is sixty inches in length, and the information is imprinted thereon thirty or more times. As the strip is bound in by every one of the ties, it is practically impossible to accidentally deface or mutilate the entire length of the same in such manner that the bale cannot be identified.

A further object of the invention is to provide a means in the nature of a press attachment for feeding an identifying strip to a position along side the bale before the bale bands are fastened, and holding the same taut while the bale bands are secured in place, so that the strip is bound in with the bale.

A still further object of the invention is to provide a mechanism for automatically severing the strip into lengths.

A still further object of the invention is to provide a reciprocatory strip gripping apparatus which will engage the end of a strip and draw the same over in alinement with the bale and hold said strip taut or practically taut during the bale tying operation.

A still further object of the invention is to provide a means for printing the strip as the latter is fed, the blank strip being arranged in a roll at one side of the machine and being drawn off in strip lengths and automatically printed during the operation.

A still further object of the invention is to provide a novel form of automatic gripper and gripper operating mechanism.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is an elevation of a strip printing and feeding means constructed in accordance with the invention, the press being shown in dotted outline. Fig. 2 is a vertical sectional view of the strip printing mechanism. Fig. 3 is a plan view of the printing mechanism with the cover or lid removed, a portion of the distributing roll being broken away in order to more clearly illustrate the construction. Fig. 4 is a vertical section showing the gripper and shears. Fig. 5 is a sectional plan view on the line 5—5 of Fig. 4. Fig. 6 is a detail perspective view of the bale provided with an identifying strip. Fig. 7 is a detail view of a portion of the same. Fig. 8 is a detail view, partly in section of the type roll. Fig. 9 is a side elevation partly in the nature of a diagram illustrating a modification of the invention.

Similar numerals of reference are employed to indicate corresponding parts throughout the several figures of the drawings.

The press shown in the accompanying drawing is of a well known type and operates in the usual manner, the bales of cotton being placed between the platens A and B for repressing.

Arranged at one end of the press is a horizontally disposed guide way formed of a pair of parallel rails 10. Between these rails are mounted a pair of grooved rollers or wheels 11 that support a carriage 12. The carriage is provided with a projecting pin 13 that enters a slot formed in one arm of a bell crank lever 14, said lever being pivoted to a fixed portion of the frame of the press and its opposite arm being connected by a link 15 to the vertically movable piston rod 16 or other member of the press. During the compressing operation, the rod 16 will move upward in order to raise the lower platen B and during this movement the carriage 12 will be moved from one side of the machine to the other. This carriage supports the strip gripping device which automatically engages with and carries the strip across the press in the manner hereinafter described.

At one side of the machine is arranged a casing 20 having a lid or cover 21, and said casing is provided at one end with a slot 22 for the entrance of the blank strip, and at the opposite end with a slot 23 for the passage of the printed strip on its way to the press.

Within the casing is arranged an ink font 24 into which projects an ink roll 25 that is mounted in suitable bearings at the sides of the casing and engaging this roller is a doctor 26 that is adjustably secured to a shaft 27, the opposite ends of which extend through openings formed in the side walls of the casing. To one end of the shaft is secured a lever having two arms 28 and 29, the arm 28 being connected to a fixed pin by means of a spring 30 that tends to rock the shaft and move the doctor from the periphery of the inking roll. The opposite arm 29 is engaged by an adjusting screw 31 which may be turned for the purpose of accurately adjusting the distance between the doctor and the roll.

Mounted in bearings in the casing are three parallel shafts 34, 35 and 36, which are connected together by gears 37. The shaft 34 carries a distributing roll 38 that engages the inking roll 25. The shaft 36 carries a roller platen 39, and shaft 35 carries an idler roll 40 under which the strip $x$ passes, the frictional contact of the strip with the platen and the roll 40 serving to revolve these rolls as the strip is drawn outward from the casing, and this transmits movement to the distributing roll 38.

Pivotally mounted on the end portions of the shaft 35 are two arms 42, the upper ends of which are provided with longitudinal slots 43 for the reception of the ends of a shaft 44 that carries a type roll 45. The type roll may be of any diameter, and owing to the arrangement of the slots 43, a type roll of one diameter may be removed and another of different diameter employed where desired, and the type rolls may be readily interchanged where the markings on the strip are to be altered.

The rolls are so constructed as to permit the ready interchanging of type, so that the strips may be printed with different identifying marks. For this purpose the roll is provided with grooves 47 extending parallel with its axis, and these grooves are arranged to receive movable type 48. In order that the type belonging to one row may not be confused with that of another row, the grooves are provided with ribs in one wall, one of such grooves having a single rib, such as 49, while the next groove will have a pair of ribs, and the third three ribs, and so forth, while the type belonging to the corresponding rows may be provided with grooves of a similar number, so that the type can only be fitted in the proper groove. After the type has been placed in position, it is locked by means of an end plate, such as 52, the plate being provided with key hole slots 53 that are arranged to receive headed pins 54 projecting from the end of the roll proper. The slots are arcuate in form, being struck from the axis of rotation of the roller, and after the heads of the pins have been inserted through the larger ends of the slots, the disk may be turned and thus locked in place.

Extending from the discharge end of the casing 20 is a strip turning plate 60, one end of the plate being at a right angle to the opposite end, and the plate being gradually curved between the two ends for the purpose of turning the strip edgewise from a horizontal to a vertical position. The discharge end of the plate 60 is provided with a cross bar 61 that is slightly spaced from the strip proper in order to more effectively guide the strip.

Secured to the carriage 12 is a depending guard arm 62 to which is pivoted a gripping jaw 63, the latter being held in gripping position by means of a spring 64. The upper end of the gripping jaw 63 is provided with a cam 65, which cam is arranged to engage a spring mounted pin 66 that is carried by an arm 67 extending from the frame. At the opposite side of the press is a second pin 68, which, also, acts to engage the cam 65 of the movable gripping jaw.

When the parts are in the position shown in Fig. 1, the end of the strip is clamped between the gripping jaws and will be held during the movement of the carriage 12 to the left, so that the strip will be carried across parallel with the side of the bale and will be held in a position slightly spaced from the side of the bale, so that it may be bound in by the bale ties. During the preliminary portion of the movement of the carriage, the cam 65 will engage the spring mounted pin 66 and the spring of the latter will be compressed allowing the cam and gripper to pass to the left without moving the gripper or releasing the identifying strip. At the completion of the compression movement of the baling press, the gripper will have passed beyond the second pin 68 and will then hold the strip taut in readiness to be bound in.

The strip is held until the compression movement of the press is complete, after which the bale bands are united in the usual manner, the bands passing over the strip and binding the same in with the bale.

In order to sever that portion of the strip which is to be attached to the bale, a pair of pivotally mounted severing blades 70 are carried by a bracket 71 projecting from the frame. The lower arms 72 of these blades are curved outward and are arranged to be engaged by a pair of pivotally mounted spring actuated lugs 73 that are carried by the lower platen B of the press. During the upward movement of the platen, these lugs will yield as they pass above the arms to the position shown in Fig. 4, without disturbing the cutting blades. On the downward movement, however, after the baling operation is complete, the lugs cannot swing on their pivots, and the blades will be forced toward each other for the purpose of severing the projected portion of the identifying strip.

When the piston rod 16 starts to descend after the completion of the baling operation, the cam 65 of the movable gripping jaw will engage the pin 68 as the carriage 12 starts on its movement to the right, and this will result in opening the gripping jaws, so that the end of the strip will be released. After passing beyond the pin, the jaws will snap shut and will continue in the closed position until the outer face of the cam 65 engages the pin 66, whereupon the movable jaw will be again moved to open position and will be held in the open position until the jaws have passed to opposite sides of that portion of the end of the identifying strip which projects from the guide 60. When this point is reached, the cam will have traveled over the pin 66, so that the jaws can snap shut in readiness for another operation.

The operating mechanism may be altered and modified in a variety of ways, one modification of the construction being shown in Fig. 9. In this case the carriage 12 is connected by a link 80 to the upper end of a pivotally mounted lever 81, and this lever has a slotted connection with the outer end of a piston rod 82. The rod is carried by a piston arranged within a suitable cylinder 83 that is under the control of a valve 84, and steam, air, water or other fluid may be employed for actuating purposes.

To the stem of the valve 84 is secured an arm 85 having slotted connection with a bar 86 that carries the core members of a pair of solenoids 87, 88. Projecting from the piston rod 16 of the baling press is a block 16' that is arranged at the upper end of the stroke to engage a contact 89 and move the same into engagement with a contact 90, thus closing a circuit from a battery 91 through wire 92, wire 93, contacts 89 and 90, wire 94, solenoid 87, and wire 95 back to battery. When the solenoid 87 is energized, it effects movement of the valve in one direction and the steam or other actuating fluid entering the cylinder 83 acts upon the piston to move the carriage. At the lower end of this stroke the block 16' engages a contact 98 and moves the same into engagement with a contact 99, thus closing a circuit from the battery 91 through the wire 92, wire 100, contacts 98, 99, wire 101 to solenoid 88 and wire 95 back to battery, thus shifting the valve in the other direction.

It is obvious that bales marked in the manner described can always be identified, for it is practically impossible to deface all of the identifying marks for the full length of the strip through any accident of handling, storage or transportation.

I claim:—

1. The combination with a baling press, of means for feeding an identifying strip alongside the bale and for holding the strip during the bale tying operation.

2. The combination with a baling press, of means for feeding an identifying strip into a position parallel with the side of the bale being compressed and for supporting said strip during the bale tying operation.

3. The combination with a baling press, of means for feeding the end of a strip into a position parallel with the side of the bale in advance of the bale tying operation, and means for automatically severing said strip.

4. The combination with a baling press, of means for clamping the end of a strip, means for moving the clamp to present the end portion of the strip in a position parallel with the side of the bale in advance of the tying operation and for holding the strip during such bale tying operation, and means for severing the fed portion of the strip.

5. In combination, a pair of clamping jaws, a carriage supporting the same, a guide for the carriage, means for reciprocating the carriage, and means arranged at the opposite ends of the guide for opening said gripping jaws.

6. In combination, a pair of spring closed strip gripping jaws, a carriage therefor, a carriage guide, means for reciprocating the carriage, a cam carried by one of the jaws, and means arranged in the path of movement of the cam and adjacent the opposite limits of travel of the carriage for opening said jaws.

7. In combination, a pair of gripping jaws, a cam carried by one of them, a spring tending to close the jaws, a carriage on which the jaws are mounted, a guide for the carriage, and a pair of yieldably mounted stops disposed adjacent the opposite limits of movement of the carriage and serving by engagement with the cam to effect opening movement of the movable jaw.

8. In combination, means for supporting the projecting end of an identifying strip, a pair of gripping jaws arranged to engage said strip, a carriage supporting the jaws, a guide for the carriage, means for reciprocating the carriage, means for opening the jaws and means for closing said jaws.

9. In combination, a strip guide arranged to support the projecting end of the strip, a pair of gripping jaws, a spring for closing the same, a carriage for the jaws, a guide for the carriage, means for reciprocating the carriage, means for opening the jaws at the opposite limits of movement of the carriage, and means for automatically severing the fed portion of the strip.

10. The combination with a press including a movable member, of a strip clamping means, and mechanism connecting said clamping means to said movable member.

11. The combination with a press, of a strip gripping device, means for guiding said strip gripping device, and means for connecting the same to a movable part of the press.

12. In combination, a press having a movable member, a strip gripping member, means for presenting a strip thereto, means for connecting said gripping member to a movable part of the press, and means actuated by the press for severing the end portion of the strip.

13. The combination with a press having a movable member, of a strip feeding means, and a strip severing means carried by the movable portion of the press.

14. The combination with a press having a movable member, of a strip feeding means, a pair of strip severing blades, and lugs carried by the movable member of the press and arranged to operate said blades.

15. In combination, a press having an actuating piston, a piston rod, a block on said rod, a guide arranged near the lower portion of the press, a carriage mounted in the guide, a bellcrank lever pivoted on the press and having one arm connected to the carriage, a link connecting the opposite arm of the lever to the block, a pair of gripping jaws on the carriage, means for opening and closing the jaws, a guide for holding the identification strip in a position to be engaged by the jaws, and means for severing the fed portion of the strip.

In testimony that I claim the foregoing as my own, I have hereto affixed my signature in the presence of two witnesses.

WREFORD L. McCARTY.

Witnesses:
   J. ROSS COLHOUN,
   JAS. W. WALKER.